US010313603B2

(12) United States Patent
Chang et al.

(10) Patent No.: US 10,313,603 B2
(45) Date of Patent: Jun. 4, 2019

(54) PHOTOGRAPH GENERATION APPARATUS THAT CONTROLS LIGHT SOURCE AND CORRECTS PHOTOGRAPH

(71) Applicant: I-AURORA CO., LTD., Seoul (KR)

(72) Inventors: Young Su Chang, Seoul (KR); Hye Kyung Kim, Seoul (KR); Hoon Kim, Seongnam-si (KR); Tae Sung Kim, Bucheon-si (KR); Hye Young Kim, Seoul (KR); Han Soo Lee, Uiwang-si (KR)

(73) Assignee: I-AURORA CO., LTD., Seoul (KR)

( * ) Notice: Subject to any disclaimer, the term of this patent is extended or adjusted under 35 U.S.C. 154(b) by 0 days.

(21) Appl. No.: 15/833,174

(22) Filed: Dec. 6, 2017

(65) Prior Publication Data

US 2018/0131854 A1    May 10, 2018

Related U.S. Application Data

(63) Continuation of application No. PCT/KR2015/013131, filed on Dec. 3, 2015.

(30) Foreign Application Priority Data

Jun. 10, 2015 (KR) .......................... 10-2015-0082194
Nov. 27, 2015 (KR) .......................... 10-2015-0167404

(51) Int. Cl.
*H04N 1/60* (2006.01)
*H04N 1/62* (2006.01)
(Continued)

(52) U.S. Cl.
CPC ............. *H04N 5/2353* (2013.01); *H04N 1/60* (2013.01); *H04N 5/2256* (2013.01);
(Continued)

(58) Field of Classification Search
CPC ................. G03B 7/095; H04N 5/238; G06T 2207/20012; G06T 2207/20021; G06T 2207/20208; G06T 5/009
See application file for complete search history.

(56) References Cited

U.S. PATENT DOCUMENTS 6,989,867 B2    1/2006  Kim
8,605,107 B2   12/2013  Choi et al.
(Continued)

FOREIGN PATENT DOCUMENTS

JP    2008-269334 A    11/2008
JP    2012-28908 A      2/2012
(Continued)

OTHER PUBLICATIONS

International Search Report issued for corresponding International Patent Application No. PCT/KR2015/013131, dated Mar. 9, 2016, with an English translation.
(Continued)

*Primary Examiner* — Noam Reisner
(74) *Attorney, Agent, or Firm* — Myers Wolin, LLC

(57) ABSTRACT

A photograph generation apparatus that controls a light source and corrects a picture using an illuminance sensor and a transparent liquid crystal, the photograph generation apparatus includes: a camera part configured to take a photographed picture of a user using the photograph generation apparatus; a lighting part configured to provide lighting for an object to be photographed using the photograph generation apparatus; an illuminance sensor part configured to measure an illuminance within a predetermined range of the photograph generation apparatus to use the measured illuminance in controlling the lighting of the lighting part; and a transparent liquid crystal panel mounted at a front surface of the camera part and configured to
(Continued)

control an amount of a light source radiated to the camera part when the picture is being taken.

13 Claims, 7 Drawing Sheets

(51) Int. Cl.
    *H04N 1/387*     (2006.01)
    *H04N 5/265*     (2006.01)
    *H04N 5/235*     (2006.01)
    *H04N 9/76*     (2006.01)
    *H04N 5/225*     (2006.01)
    *H04N 5/232*     (2006.01)
    *H04N 5/355*     (2011.01)

(52) U.S. Cl.
    CPC ......... *H04N 5/2351* (2013.01); *H04N 5/2354* (2013.01); *H04N 5/23219* (2013.01); *H04N 5/23229* (2013.01); *H04N 5/265* (2013.01); *H04N 5/35536* (2013.01); *H04N 9/76* (2013.01); *H04N 1/3871* (2013.01); *H04N 1/628* (2013.01)

(56) References Cited

U.S. PATENT DOCUMENTS

| | | | |
|---|---|---|---|
| 8,885,937 | B2 | 11/2014 | Yi et al. |
| 2007/0071350 | A1* | 3/2007 | Lee .................. G06T 5/008 382/260 |
| 2008/0074380 | A1* | 3/2008 | Owyeung ........... G06F 3/04847 345/102 |
| 2012/0008862 | A1* | 1/2012 | Das Gupta ................ G06T 5/20 382/167 |
| 2014/0307159 | A1* | 10/2014 | Takagi .................. H04N 5/2254 348/364 |
| 2015/0002904 | A1* | 1/2015 | Nakamura ......... G06K 15/1872 358/3.01 |
| 2015/0138378 | A1* | 5/2015 | Imahira .............. H04N 1/00161 348/207.2 |

FOREIGN PATENT DOCUMENTS

| | | |
|---|---|---|
| JP | 10-2012-0042004 A | 5/2012 |
| JP | 2013-162516 A | 8/2013 |
| JP | 10-2014-0124431 A | 10/2014 |
| JP | 2015-62290 A | 4/2015 |
| KR | 10-2007-0041089 A | 4/2007 |

OTHER PUBLICATIONS

Extended European search report with supplementary European search report and the European search opinion issued by the European Patent Office for corresponding European Patent Application No. 15895060.0, dated Nov. 2, 2018.

* cited by examiner (a) (b)

PHOTOGRAPH GENERATION APPARATUS THAT CONTROLS LIGHT SOURCE AND CORRECTS PHOTOGRAPH

CROSS-REFERENCE

This application is a continuation application of international application PCT/KR2015/013131, filed on Dec. 3, 2015, now pending, which claims foreign priority from Korean Patent Application No. 10-2015-0167404, filed on Nov. 27, 2015 in the Korean Intellectual Property Office and Korean Patent Application No. 10-2015-0082194, filed on Jun. 10, 2015 in the Korean Intellectual Property Office, the disclosure of each document is incorporated herein by reference in their entirety.

TECHNICAL FIELD

The present invention relates to a photograph generation apparatus that controls a light source and corrects a picture, and more particularly, to a photograph generation apparatus capable of controlling a brightness of lighting and a transmittance of light radiated to a camera part, thereby correcting a photographed picture or compositing the photographed picture with another image.

BACKGROUND ART

Due to the recent development and changes in technologies related to images and videos, various desires of users for shortening a printing time, compositing and editing images, and the like are increasing.

Accordingly, various photograph generation apparatuses such as a sticker photograph vending machine, a kiosk, and an automatic ticketing machine have appeared, and it is now possible to generate and edit a picture using the above-mentioned photograph generation apparatuses instead of personal cameras in various external spaces such as a movie theater, a department store, a shopping mall, and a downtown.

The automatic ticketing machine refers to an apparatus that issues tickets in place of people in a movie theater, a stadium, a concert hall, an exhibition hall, a museum, a tourist site, and the like. The tickets issued by the automatic ticketing machine show viewing information such a date, a movie name, a match name, a performance name, an exhibition name, a viewing place, a viewing location, and the like, and a general automatic ticketing machine may include a personal computer (PC), a monitor, a receipt printer, a card reader, a bill recognizer, a fee calculator.

Conventionally, the automatic ticketing machine has played a role of only issuing tickets containing the viewing information. However, due to the recent development of technologies for processing and compositing image data, the automatic ticketing machine provides additional enjoyment to a user by providing the user with an instant picture taking service or instant picture compositing service with a celebrity/cartoon character/background using a provided camera or a picture input by the user. Particularly, the automatic ticketing machine has a printer mounted therein and allows the user to own a ticket on which the photographed or composited picture is printed. Also, the photographed or composited picture may be sent via a mobile phone, e-mail, and social network service (SNS) through wired and wireless network connections and shared.

More specifically, as mentioned above, in addition to taking a picture using a camera, the photograph generation apparatus including the above-described automatic ticketing machine provides services of inserting an additional image, compositing a picture, correcting a picture, inserting a text, and compositing or editing a picture taken by a user with a picture (hereinafter, a photograph object) of an entertainer or celebrity such as an actor, an actress, and a singer and also provides a service in which the photograph object appears in a photographing standby screen of the photograph generation apparatus and a picture is taken as if the user is taking a picture with the photograph object.

However, in many cases, the photograph generation apparatus that provides various services as above is provided in a space having a large floating population or an area having a large number of visitors. Thus, in many cases, the photograph generation apparatus is located at an open space, i.e., outside, instead of a closed space equipped with separate lighting only for taking a picture.

Consequently, the photograph generation apparatus located in the above-mentioned open space is highly affected by a light source when generating a photograph. Particularly, when there is backlight behind a user to be photographed or a brightness of a space in which the photographing takes place has a relatively low illuminance, quality of a photographed picture tends to be extremely deteriorated due to the influence of the light source. Particularly, there is a problem in that color inconsistency with the above-described photograph object occurs, and thus it is impossible to generate or composite a photograph with a satisfactory quality.

Accordingly, to solve the above problem, a technology for correcting a brightness of a picture by a software approach, i.e., a program, has appeared. However, when there is severe backlight or an illuminance is extremely low as describe above, because the photograph generation apparatus is highly affected by the light source, the light source is not sufficiently corrected only by the above software approach, and the above-described problem cannot be solved.

Therefore, a method for solving the above-described problem is required.

DISCLOSURE

Technical Problem

It is an objective of the present invention to provide a photograph generation apparatus that controls a light source using an illuminance sensor and a transparent liquid crystal to solve the above-described problem.

It is another objective of the present invention to provide a photograph generation apparatus that adjusts a brightness of lighting on the basis of an illuminance measured using the illuminance sensor.

It is still another objective of the present invention to provide a photograph generation apparatus that adjusts an amount of a light source input to a camera by controlling opening/closing of the transparent liquid crystal at a front surface of the camera on the basis of the illuminance measured using the illuminance sensor.

It is yet another objective of the present invention to provide a photograph generation apparatus that prints a photograph generated by compositing one or more corrected images on papers or media.

The objectives to be achieved by the embodiments of the present invention are not limited to the above, and other unmentioned objectives should be clearly understood by one of ordinary skill in the art to which the present invention pertains from the description below.

Technical Solution

To solve the above-described problem, a photograph generation apparatus that controls a light source and corrects a picture according to the present invention includes a camera part configured to take a photographed picture of a user using the photograph generation apparatus, a lighting part configured to provide lighting for an object to be photographed using the photograph generation apparatus, an illuminance sensor part configured to measure an illuminance within a predetermined range of the photograph generation apparatus to use the measured illuminance in controlling the lighting of the lighting part, and a transparent liquid crystal panel mounted at a front surface of the camera part and configured to control an amount of a light source radiated to the camera part when the picture is being taken, wherein the lighting part and the transparent liquid crystal panel are able to respectively control a brightness of the lighting and opening/closing of the transparent liquid crystal panel on the basis of the illuminance measured by the illuminance sensor.

In the photograph generation apparatus that controls a light source and corrects a picture according to the present invention, brightness levels of the lighting provided by the lighting part may be classified as Low, Normal, and High, and the lighting part may control the brightness level of the lighting due to the lighting part on the basis of the illuminance measured by the illuminance sensor part.

In the photograph generation apparatus that controls a light source and corrects a picture according to the present invention, the lighting part may control the brightness of the lighting to be set as High when the illuminance measured by the illuminance sensor part is a low illuminance that is lower than a predetermined reference, and the lighting part may control the brightness of the lighting to be set as Low when the illuminance measured by the illuminance sensor part is a high illuminance that is higher than the predetermined reference.

In the photograph generation apparatus that controls a light source and corrects a picture according to the present invention, a transmittance of a light source radiated to the camera part may be controlled by controlling opening/closing of the transparent liquid crystal panel, and the opening/closing of the transparent liquid crystal panel may be controlled on the basis of the illuminance measured by the illuminance sensor part.

In the photograph generation apparatus that controls a light source and corrects a picture according to the present invention, the transparent liquid crystal panel may be controlled to be open when the illuminance measured by the illuminance sensor part is a low illuminance that is lower than a predetermined reference, and the transparent liquid crystal panel may be controlled to be closed when the illuminance measured by illuminance sensor part is a high illuminance that is higher than the predetermined reference.

In the photograph generation apparatus that controls a light source and corrects a picture according to the present invention, the camera part may capture an image of a user to which results of controlling the lighting part and the transparent liquid crystal panel are reflected and generate a photographed picture of the user.

In the photograph generation apparatus that controls a light source and corrects a picture according to the present invention, the photograph generation apparatus may generate an image in which the photographed picture of the user and a photograph object are composited.

In the photograph generation apparatus that controls a light source and corrects a picture according to the present invention, when generating the composite image, the photograph generation apparatus may perform image correcting for each channel for the photographed picture of the user and the photograph object using a pre-installed program and then generate the composite image.

In the photograph generation apparatus that controls a light source and corrects a picture according to the present invention, the photograph generation apparatus may further include a printer configured to print the image in which the photographed picture of the user and the photograph object are composited.

In the photograph generation apparatus that controls a light source and corrects a picture according to the present invention, the image correcting may include one or more of histogram matching, filtering, and color correcting, the histogram matching may include estimating a minimum value and a maximum value for each channel for the photographed picture of the user and the photograph object and performing histogram stretching on the basis of the estimated minimum value and maximum value, the filtering may include processing the photographed picture of the user using a bilateral filter, and the color correcting may include correcting color or correcting skin color through face detection for the photographed picture of the user and the photograph object.

In the photograph generation apparatus that controls a light source and corrects a picture according to the present invention, the color correcting may be performed by extracting a saturation component using color space conversion, in which brightness and chromaticity are separated, and increasing the extracted saturation component for the photographed picture of the user and the photograph object.

In the photograph generation apparatus that controls a light source and corrects a picture according to the present invention, the correcting of the skin color may include detecting a skin color region from each of the photographed picture of the user and the photograph object, comparing the detected skin color region with a predetermined preferred skin color, proportionally calculating a skin color difference between the skin color regions and the predetermined preferred skin color, and correcting the skin color region of each of the photographed picture of the user and the photograph object by the calculated skin color difference.

In the photograph generation apparatus that controls a light source and corrects a picture according to the present invention, the image correcting may further include estimating a light source brightness of each of the photographed picture of the user and the photograph object using the Retinex algorithm and correcting the estimated light source brightness.

In the photograph generation apparatus that controls a light source and corrects a picture according to the present invention, the correcting of the estimated light source brightness may further include performing multiple Retinex using the estimated light source brightness.

In the photograph generation apparatus that controls a light source and corrects a picture according to the present invention, the image correcting for each channel may include separating a brightness component and a chromaticity component using color space conversion for each of the photographed picture of the users and the photograph object and enhancing color and contrast of the separated brightness component.

In the photograph generation apparatus that controls a light source and corrects a picture according to the present invention, the image correcting for each channel may further include performing histogram comparison for the separated brightness component, analyzing an increase in gradation and distribution for each level of gray gradation, and correcting a saturation and correcting a skin color region for each of the photographed picture of the user and the photograph object on the basis of a result of the analysis.

In the photograph generation apparatus that controls a light source and corrects a picture according to the present invention, the histogram comparison may reduce over-enhancement that occurs when the photographed picture of the user and the photograph object are globally enhanced while maintaining a histogram shape of the brightness component of each of the photographed picture of the user and the photograph object to be constant.

In the photograph generation apparatus that controls a light source and corrects a picture according to the present invention, the photograph generation apparatus may be a kiosk that includes functions of photographing and editing a picture.

Advantageous Effects

According to the present invention, advantageous effects described below can be obtained. However, the advantageous effects that can be obtained by the present invention are not limited thereto.

First, according to the present invention, a photograph generation apparatus that controls a light source using an illuminance sensor and a transparent liquid crystal can be provided.

Second, according to the present invention, a brightness of a lighting of the photograph generation apparatus can be adjusted on the basis of an illuminance measured using the illuminance sensor.

Third, according to the present invention, an amount of a light source input to a camera can be adjusted by controlling opening/closing of the transparent liquid crystal at a front surface of the camera on the basis of the illuminance measured using the illuminance sensor.

Fourth, according to the present invention, a photograph generation apparatus that prints a photograph generated by compositing one or more corrected images on papers or media can be provided.

The advantageous effects that can be obtained from the present invention are not limited to the above-mentioned advantageous effects, and other unmentioned advantageous effects should be clearly understood by one of ordinary skill in the art to which the present invention pertains from the description below.

MODES OF THE INVENTION

Figure 1:
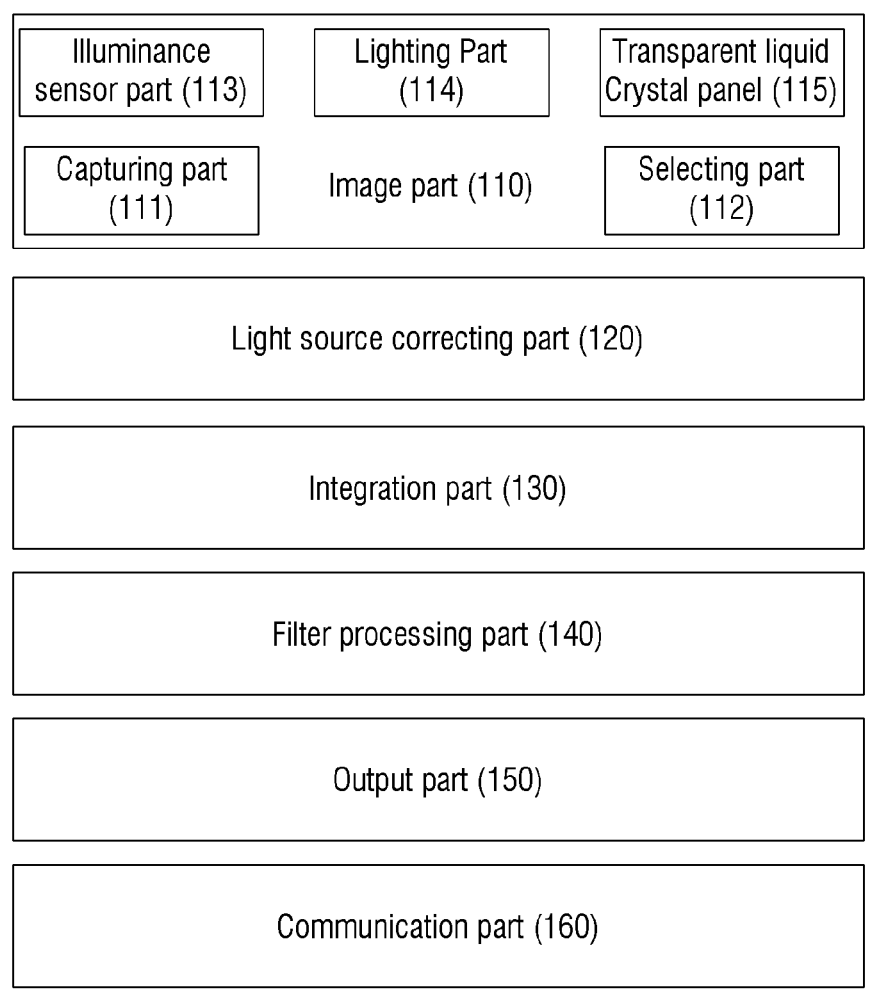
FIG. 1 is an exemplary view of a configuration of a photograph generation apparatus to which the present invention is applicable.

Hereinafter, exemplary embodiments according to the present invention will be described in detail below with reference to the accompanying drawings. The detailed description to be given below with reference to the accompanying drawings is for describing exemplary embodiments of the present invention and is not intended to represent the only embodiment in which the present invention may be practiced.

The present embodiments are provided to make the disclosure of the present invention complete and completely inform one of ordinary skill in the art to which the present invention pertains of the scope of the invention, and the present invention is defined only by the scope of the claims below.

In some cases, to avoid blurring the concept of the present invention, known structures and devices may be omitted from the drawings, or a structure and a device may be illustrated in the form of a block diagram focused on key functions of the structure and the device. Also, throughout the present specification, like elements are denoted by like reference numerals.

Throughout the specification, when a certain part is described as "comprising" or "including" a certain element, this signifies that the certain part may also include another element rather than excluding the other element unless particularly described otherwise.

In the present specification, the term "part" refers to a unit of processing one or more functions or operations, and a "part" may be implemented with hardware, software, or a combination of hardware and software. Further, terms such "a," "an," "one," and other similar related words may be used as including both singular and plural meanings unless indicated otherwise herein in the context of the present invention or clearly contradicted by the context.

Further, specific terms used in the embodiments of the present invention are provided to assist understanding of the present invention, and unless defined otherwise, all terms used herein including technical or scientific terms have the same meanings as those generally understood by one of ordinary skill in the art to which the present invention pertains. The use of such specific terms may be changed in other forms within the scope not departing from the technical spirit of the present invention.

Hereinafter, exemplary embodiments according to the present invention will be described in detail below with reference to the accompanying drawings. The detailed description to be given below with reference to the accompanying drawings is for describing exemplary embodiments of the present invention and is not intended to represent the only embodiment in which the present invention may be practiced.

FIG. 1 is an exemplary view of a configuration of a photograph generation apparatus to which the present invention is applicable.

Referring to FIG. 1, the photograph generation apparatus to which the present invention is applicable may include an image part 110, which includes a capturing part 111, a selecting part 112, an illuminance sensor part 113, a lighting part 114, and a transparent liquid crystal panel 115, a light source correcting part 120, an integration part 130, a filter processing part 140, an output part 150, and a communication part 160.

However, unlike in FIG. 1, some of the above-mentioned elements may be omitted from the photograph generation apparatus, or, conversely, the photograph generation apparatus may further include elements other than those mentioned above.

Referring again to FIG. 1, the image part 110 provides an image of a user to be photographed and a photograph object. That is, the capturing part 111 included in the image part 110 may display an image of the user to be photographed on a screen of the photograph generation apparatus or capture the user, and the selecting part 112 included in the image part 110 may select a photograph object to be arranged with the image of the user on the screen of the photograph generation apparatus on the basis of an input by the user or a predetermined setting.

In the present invention, the user may select the photograph object through the selecting part 112 before/after being photographed using the photograph generation apparatus. Here, the photograph object may refer to a pre-produced image or video of any of an entertainer or celebrity, a specific cartoon character, and a specific background.

Referring again to FIG. 1, the illuminance sensor part 113 included in the image part 110 may measure an illuminance within a predetermined range of the photograph generation apparatus to use the measured illuminance in controlling lighting. In the present invention, the photograph generation apparatus may control operations of the lighting part 114 and the transparent liquid crystal panel 115 in the image part 110 on the basis of the illuminance measured by the illuminance sensor part 113. This will be described in detail below.

The light source correcting part 120 of the photograph generation apparatus according to the present invention may estimate a light source from the image of the user acquired by the camera of the capturing part 111 and further correct the light source. That is, in the present invention, although the photograph generation apparatus adjusts/controls an amount of a light source radiated to the camera using hardware by controlling a brightness of the lighting and opening/closing of the transparent liquid crystal panel on the basis of the illuminance measured by the illuminance sensor part as mentioned above, along with this, the photograph generation apparatus may also perform the adjustment/control using software by the light source correcting part 120.

The integration part 130 of the photograph generation apparatus may composite the image of the user and the photograph object, and the filter processing part 140 may perform additional filter processing on the composite object according to an input of the user or according to a command pre-input to the photograph generation apparatus.

The output part 150 may output the composite object or an object resulting from performing additional filter processing on the composite object. In the present invention, the output part 150 in the photograph generation apparatus may include any printer such as a printer and a photograph printer having a function of outputting a picture.

The communication part 160 may send the composite object via a mobile phone, e-mail, social network service (SNS), and the like through wired and wireless networks.

Here, the wired and wireless networks may include both a short-range communication module and a wireless communication means using radio waves or infrared rays, and any wireless communication means that will be developed in the future may be applied.

For example, the short-range communication module refers to a module for communication within a predetermined range. Bluetooth, radio frequency identification (RFID), infrared data association (IrDA), ultra wideband (UWB), ZigBee, and the like may be used as a short range communication technology.

The wireless communication means may be an internet protocol (IP) network that provides a service of transmitting and receiving high-capacity data through an IP and a data service without a disconnection phenomenon or an all IP network that has an IP network structure in which different networks are integrated on the basis of IP networks, and may be formed by combining one or more of a wired network, a wireless broadband (Wibro) network, a mobile communication network including wideband code division multiple access (WCDMA), a mobile communication network including a high speed downlink packet access (HSDPA) network and a long term evolution (LTE) network, a mobile communication network including LTE advanced, a satellite communication network, and a wireless fidelity (Wi-Fi) network.

The photograph generation apparatus may capture the image of the user as a picture or process composition between the image of the user and the photograph object, and, for example, may be implemented in the form of a kiosk, a sticker photograph machine, an automatic ticketing machine, and the like.

The photograph generation apparatus may acquire the image of the user from the camera included in the capturing part 111 and reproduce the image on the screen. Also, to simultaneously express the photograph object an the real-time camera image on the screen of the photograph generation apparatus, the photograph generation apparatus may express photograph objects before/after the photographing in the form of pictures, animations, or the like overlapping the camera image on the screen.

Figure 2:
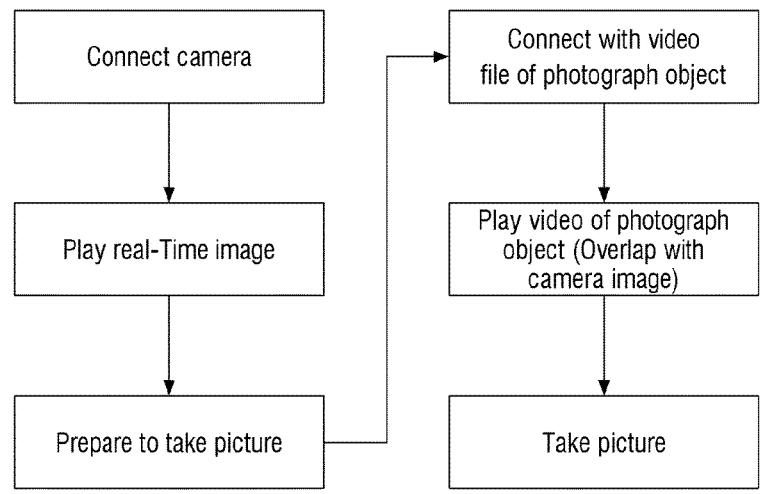
FIG. 2 is an exemplary view for describing a process in which the photograph generation apparatus, to which the present invention is applicable, takes a picture by connecting a camera.

FIG. 2 is an exemplary view for describing a process in which the photograph generation apparatus, to which the present invention is applicable, takes a picture by connecting a camera.

Referring to FIG. 2, the photograph generation apparatus to which the present invention is applicable may include a camera and may connect the camera to take a photographed picture of the user according to a request, an input, or the like of the user to be photographed using the photograph generation apparatus.

Here, the camera may play the image of the user in real time through an inner or outer screen (display part), and when the image of the user is played on the screen as above, it may be assumed that preparation to take a picture with the camera is completed.

As mentioned above, the photograph generation apparatus may connect the photograph object that may be expressed with an image or a moving picture to the real-time camera image to simultaneously express the real-time camera image and the photograph object on the screen of the photograph generation apparatus. That is, the photograph generation apparatus may open a file of a selected photograph object according to an input of the user or a preset command in the photograph generation apparatus, and show the corresponding file, i.e., the selected photograph object, in the form of a picture, an animation, or the like overlapping the camera image on the screen of the photograph generation apparatus.

Then, the photograph generation apparatus may take a picture according to an input of the user or a preset timer in the photograph generation apparatus. Here, although the captured picture may include only the image of the user, the captured picture may also be a single picture in which both the photograph object and the image of the user are included as mentioned above.

Although not illustrated in FIG. 2, as will be described below, the photograph generation apparatus may control a brightness of the lighting and opening/closing of the transparent liquid crystal panel on the basis of a measured illuminance and adjust an amount of a light source to be applied to a picture that will be generated by the photograph generation apparatus. Also, along with the above or separate from the above, after the picture is taken, the photograph generation apparatus may estimate a light source (for example, a brightness of the light source, and the like) from the picture acquired from the camera in the capturing part and correct the light source and the like of the picture on the basis of the estimated light source using software.

More specifically, generally, color inconsistency occurs between a picture or an image acquired through a camera and a photograph object to be composited due to an influence of a peripheral light source, and an image having a satisfactory image quality may not be provided in some cases.

Consequently, to reduce an influence of a peripheral light source, the photograph generation apparatus may control the brightness of the lighting and the opening/closing of the transparent liquid crystal panel on the basis of the illuminance measured by the illuminance sensor part and adjust/control the amount of the light source radiated to the camera using hardware as mentioned above, and along with this or separate from this, may also estimate a brightness of a light source for a photographed image, perform the adjustment/control using software, and correct the picture on the basis of the estimated brightness of the light source.

In the adjustment using software, for example, a light source brightness of the picture or image may be estimated and corrected using the Retinex algorithm based on color constancy in which a unique color of an object is recognized by offsetting an effect of a peripheral light source using light energy reflected from the object.

For this, first, the photograph generation apparatus may convert a red-green-blue (RGB) image into a YCbCr space, apply Gaussian kernels of various sizes to a brightness channel in the YCbCr space, and calculate a brightness component of a light source. To correct the brightness, the photograph generation apparatus may give out the calculated brightness of the light source to the brightness channel of the picture or image and correct the brightness of the light source in the picture or image. Here, multiple Retinex in which the Retinex algorithm is repeatedly applied may also be performed.

To composite the picture and the like which has gone through pre-processing referred to as light source correcting according to the above process and the like and the photograph object, the photograph generation apparatus may adjust color and contrast of each of the picture and the photograph object, convert the colors and contrasts to be similar to each other, and then perform the composition.

a) Contrast Adjustment

For a picture or image to be expressed well, contrast should be adjusted such that a gradation of each channel is uniformly distributed. However, in a generally used RGB color space, color of a picture or image changes due to correlation between channels. Consequently, to reduce such distortion of color, the photograph generation apparatus separates brightness and chromaticity by color space conversion and extracts and analyzes only the brightness component.

The photograph generation apparatus may extract only the brightness component and then analyze an increase in gradation and distribution for each level of gray gradation through histogram comparison of the brightness.

Consequently, the photograph generation apparatus may reduce over-enhancement that occurs when enhancement is globally performed while maintaining a histogram shape to be similar.

b) Saturation Adjustment

Color may be enhanced in the picture or image whose brightness is enhanced in the photograph generation apparatus by saturation adjustment. Similar to the contrast adjustment, only a saturation component according to brightness may be extracted using color space conversion capable of separating chromaticity and brightness components, such as Commission International de L'eclairage 1976 L*a*b* (CIELAB) and hue-saturation-value (HSV), and the saturation component may be increased to perform correction. Also, a skin color may be locally estimated, and the skin color may be corrected to reproduce a preferred skin color. This will be described in detail with reference to FIGS. 5 to 10.

Figure 3:
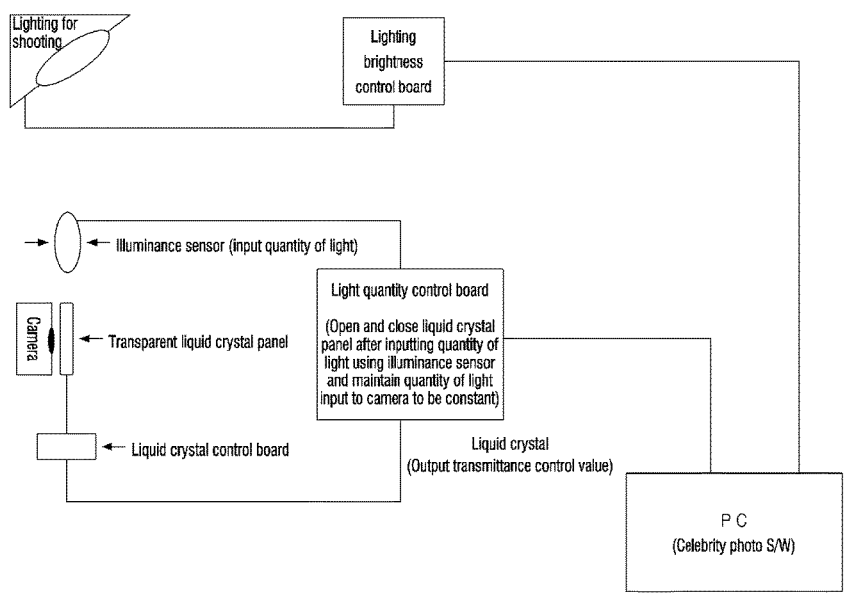
FIG. 3 is an exemplary view for describing a process in which the photograph generation apparatus according to one embodiment of the present invention controls a light source using an illuminance sensor and a transparent liquid crystal.
Figure 4:
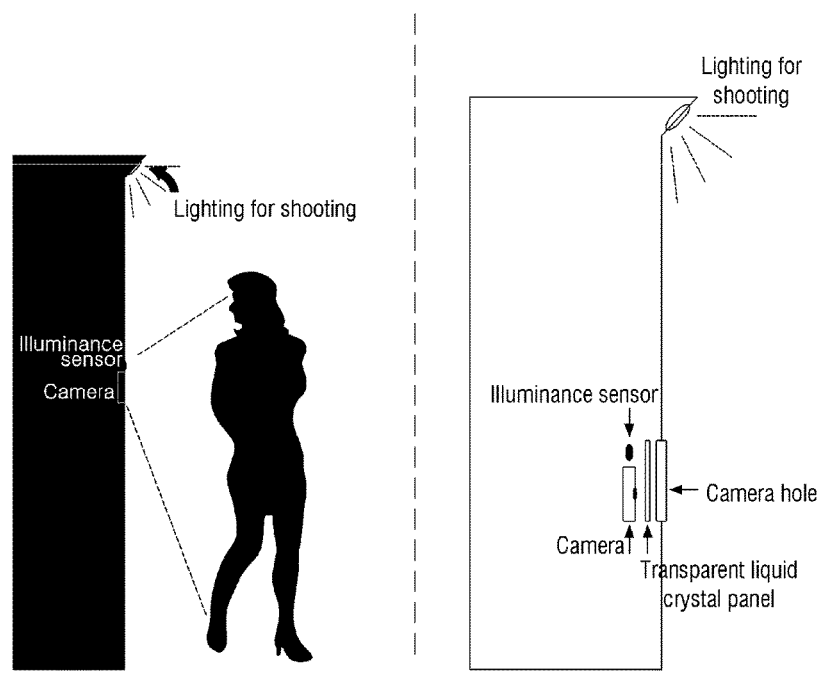
FIG. 4 is an exemplary view for describing a state in which the photograph generation apparatus that controls a light source using the illuminance sensor and the transparent liquid crystal according to one embodiment of the present invention is implemented in the form of a kiosk.

FIG. 3 is an exemplary view for describing a process in which the photograph generation apparatus according to one embodiment of the present invention controls a light source using an illuminance sensor and a transparent liquid crystal, and FIG. 4 is an exemplary view for describing a state in which the photograph generation apparatus according to one embodiment of the present invention is implemented in the form of a kiosk.

First, referring to FIG. 3, according to one embodiment of the present invention, for the photograph generation apparatus to control a light source using the illuminance sensor and the transparent liquid crystal, the illuminance sensor part in the photograph generation apparatus may measure an illuminance within a predetermined range of the photograph generation apparatus.

That is, a predetermined space for taking a picture may be disposed at a front portion of the photograph generation apparatus, and the predetermined space may have a size in a range in which capturing is possible by the photograph generation apparatus. Because the user may take a picture in the predetermined space for taking a picture, the illuminance sensor part of the photograph generation apparatus may measure the illuminance within the range of the predetermined space.

In the present invention, an illuminance refers to a measured value resulting from dividing a luminous flux transmitted through the range of the predetermined space by an area of the range of the predetermined space, and refers to brightness of the range of the predetermined space. Lux or candela (cd) may be used as a unit of illuminance. Here, 1 lux is a spot that is spaced 1 m apart from a light source of 1 candle-power and refers to a brightness of a surface perpendicular to the light. The illuminance may be ¼, ⅑, and ¹⁄₁₆ when a distance from the light source is two times the above, three times the above, and four times the above, respectively.

The photograph generation apparatus (or a separate control part may perform the control below) may control a brightness of lighting used when a picture is taken with the photograph generation apparatus on the basis of the illuminance measured by the illuminance sensor part.

More specifically, in the present invention, brightness levels of the lighting provided by the lighting part may be classified as Low, Normal, and High. However, this is merely an example, and embodiments are not limited thereto. The brightness levels may be classified into subdivided levels or fewer levels.

The lighting part in the photograph generation apparatus may control the brightness of the lighting by setting the brightness to be at the brightness level corresponding to the illuminance measured by the illuminance sensor part, among the brightness levels of the lighting.

For example, the lighting part may control the brightness of the lighting to be set as High when the illuminance measured by the illuminance sensor part is a low illuminance that is lower than a predetermined reference, and in this case, because the brightness of the lighting becomes more intense, a larger amount of a light source may be introduced when a picture is taken with the photograph generation apparatus. Also, the lighting part may control the brightness of the lighting to be set as Low when the illuminance measured by the illuminance sensor part is a high illuminance that is higher than the predetermined reference, and in this case, because the brightness of the lighting becomes relatively weak, only a small amount of the light source may be introduced when a picture is taken with the photograph generation apparatus.

The photograph generation apparatus (or a separate control part may perform the control below) according to the present invention may control opening/closing of the transparent liquid crystal panel mounted at a front surface of a camera part and configured to control an amount of a light source radiated to the camera part when a picture is being taken, on the basis of an illuminance measured by the illuminance sensor part.

More specifically, the transparent liquid crystal panel may be attached to the front surface of the camera part of the photograph generation apparatus, and the transparent liquid crystal panel may be opened and closed. A transmittance of a light source radiated to the camera part may be controlled according to whether the transparent liquid crystal panel is opened or closed, like a blind that is attached to a window and controls an amount of sunlight introduced into an indoor space. In the present invention, the opening/closing of the transparent liquid crystal panel may be controlled on the basis of the illuminance measured by the illuminance sensor part, and ultimately, by the above, a transmittance of the light source radiated to the camera part may be controlled. Accordingly, an amount of the light source for a picture taken by the photograph generation apparatus may be adjusted.

For example, the transparent liquid crystal panel may be controlled to be open when the illuminance measured by the illuminance sensor part is a low illuminance that is lower than a predetermined reference, and in this case, because the amount of the light source radiated to the camera becomes relatively large, a larger amount of the light source may be introduced when a picture is taken by the photograph generation apparatus. Also, the transparent liquid crystal panel may be controlled to be closed when the illuminance measured by illuminance sensor part is a high illuminance that is higher than the predetermined reference, and in this case, because the amount of the light source radiated to the camera becomes relatively small, only a small amount of the light source may be introduced when a picture is taken by the photograph generation apparatus.

Consequently, as illustrated in FIG. 4, the photograph generation apparatus according to one embodiment of the present invention may control the brightness of the lighting due to the lighting part and/or the transmittance of the light source radiated to the camera due to the transparent liquid crystal panel on the basis of the illuminance measured by the illuminance sensor, and accordingly, the camera of the photograph generation apparatus may capture an image of the user to which results of controlling the lighting part and the transparent liquid crystal panel are reflected and generate a photographed picture of the user.

Referring again to FIG. 3, the photograph generation apparatus that has generated the photographed picture of the user by reflecting the results of controlling the lighting part and the transparent liquid crystal panel may output the photographed picture of the user without change or output the photographed picture of the user after compositing the photographed picture of the user and a photograph object pre-selected by the user. However, unlike this, the photographed picture of the user may be further corrected according to a process of software pre-installed in the photograph generation apparatus.

The further correction performed according to the process of the software will be described in detail with reference to FIGS. 5 to 10.

Figure 5:
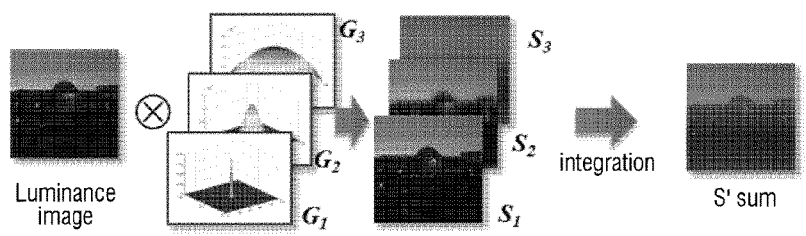
FIG. 5 is an exemplary view for describing a process in which the photograph generation apparatus estimates a brightness of a light source according to one embodiment of the preset invention.
Figure 6:
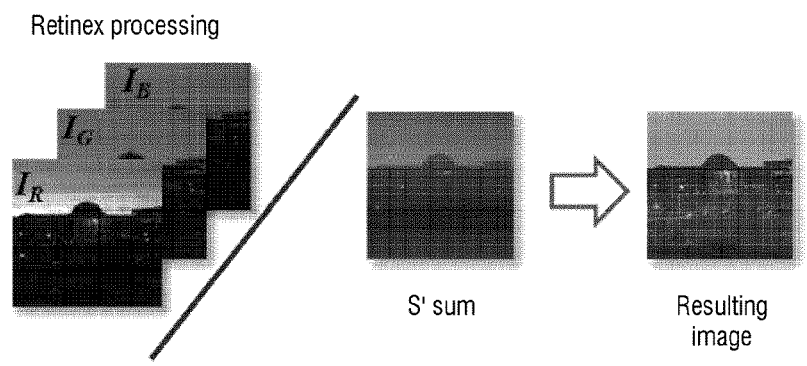
FIG. 6 is an exemplary view for describing a process in which the photograph generation apparatus corrects the brightness of the light source according to one embodiment of the present invention.

FIG. 5 is an exemplary view for describing a process in which the photograph generation apparatus estimates a brightness of a light source according to one embodiment of the preset invention, and FIG. 6 is an exemplary view for describing a process in which the photograph generation apparatus corrects the brightness of the light source according to one embodiment of the present invention.

First, referring to FIG. 5, to further correct the photographed picture of the user using software, first, the photograph generation apparatus may extract a brightness component from the photographed picture of the user. For this, a brightness image may be obtained through YCbCr color space conversion.

Here, HSV, hue-intensity-saturation (HIS), CIELAB conversions and the like may be used for the color space to obtain the brightness component, and as illustrated in FIG. 5, the brightness component of the light source may also be estimated using Gaussian Kernels.

For this, three Gaussian kernels G1, G2, and G3 may be generated as illustrated in FIG. 5 using a standard deviation σ of the differently set Gaussian functions as below, and the generated three Gaussian kernels may be applied to the brightness component of the picture. Then, as illustrated in Equation 1, the photograph generation apparatus may add a weighting value w to pictures to which the kernels are applied, and then estimate a brightness component S' of a light source in a corresponding picture.

$$S'_{sum}(x, y, \sigma_m) = \sum_{m=1}^{M} w(\sigma_m)\{G_m(x, y) \times Y(x, y)\} \quad \text{Equation 1}$$

Referring to FIG. 6, to further correct the photographed picture of the user according to a process using software, the photograph generation apparatus may correct the brightness of the light source of the picture extracted according to the above description with reference to FIG. 5 to be brighter or darker.

That is, the photograph generation apparatus may correct the brightness of the light source in the photographed picture of the user. More particularly, as in Equation 2 below, the photograph generation apparatus may correct the brightness of the light source by dividing each channel I of an RGB image by the light source S' estimated according to Equation 1 above.

$$R_t(x, y, \sigma_m) = A \frac{I_t(x, y)}{S'_{sum}(x, y, \sigma_m)}, \quad \text{Equation 2}$$

$t = R, G, B, A$:gain coefficient

As described above, the photograph generation apparatus according to the present invention may composite or integrate the photographed picture of the user and a photograph object. That is, the photograph generation apparatus may generate a composite image of the photographed picture of the user and the photograph object. Here, the photograph object and the photographed picture of the user may be composited or integrated by including enhancements in color and contrast.

To composite the photographed picture of the user in which the light source is corrected and the photograph object, the photograph generation apparatus may adjust color and contrast of each of the photographed picture of the user and the photograph object and convert the colors and contrasts to be similar to each other and then perform the composition.

To analyze the contrasts of the photographed picture of the user and the photograph object, the photograph generation apparatus according to the present invention may first calculate a histogram range between each channel, estimate a minimum value and a maximum value, and perform histogram matching to match the minimum value and the maximum value between two objects. Also, the photograph generation apparatus may further adjust filter and color of the photographed picture of the user and then composite the photographed picture of the user with the photograph object.

Figure 7:
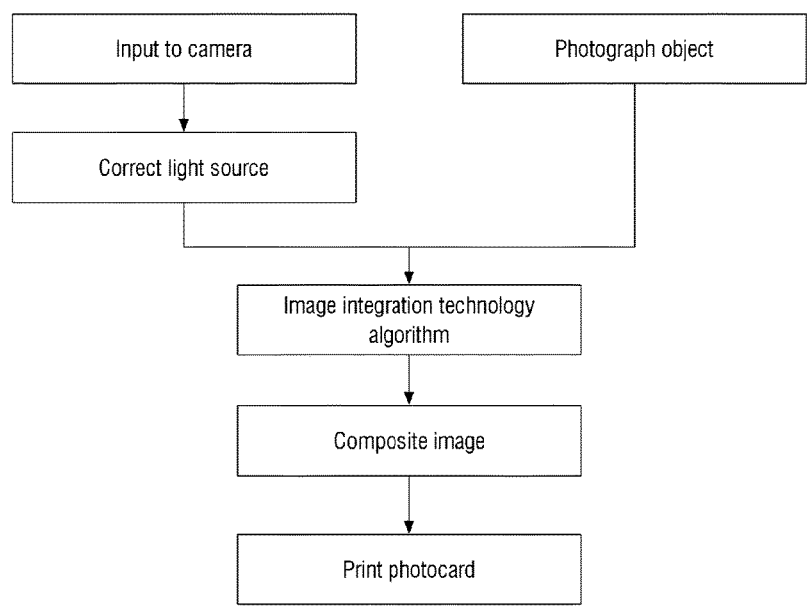
FIG. 7 is an exemplary view for describing a process in which the photograph generation apparatus composites a photographed picture of a user and a photograph object according to one embodiment of the present invention.

FIG. 7 is an exemplary view for describing a process in which the photograph generation apparatus composites a photographed picture of a user and a photograph object according to one embodiment of the present invention.

Referring to FIG. 7, as mentioned above, the photograph generation apparatus according to one embodiment of the present invention may generate an image in which the photographed picture of the user and a photograph object are composited. For this, the photograph generation apparatus may adjust the brightness of the lighting and the amount of the light source introduced into the camera using the illuminance according to the method described above with reference to FIGS. 1 to 4 or estimate the light source of the photographed picture of the user and correct the light source according to the method described above with reference to FIGS. 5 and 6, and may composite the photograph object and the photographed picture of the user that has gone through each of the processes or all of the processes using an image integration technology. Here, the image integration technology may be interpreted as a concept that encompasses technologies for combining or compositing images released so far and all technologies for combining or compositing images that will be newly released in the future.

The image integration may include image integration by enhancing color and contrast and image integration by correcting skin color and gray gradation. The photograph generation apparatus may send a composite image generated by the image integration to a printer capable of outputting a picture and output the composite image, or unlike this, may display the composite image on the screen in the photograph generation apparatus.

Figure 8:
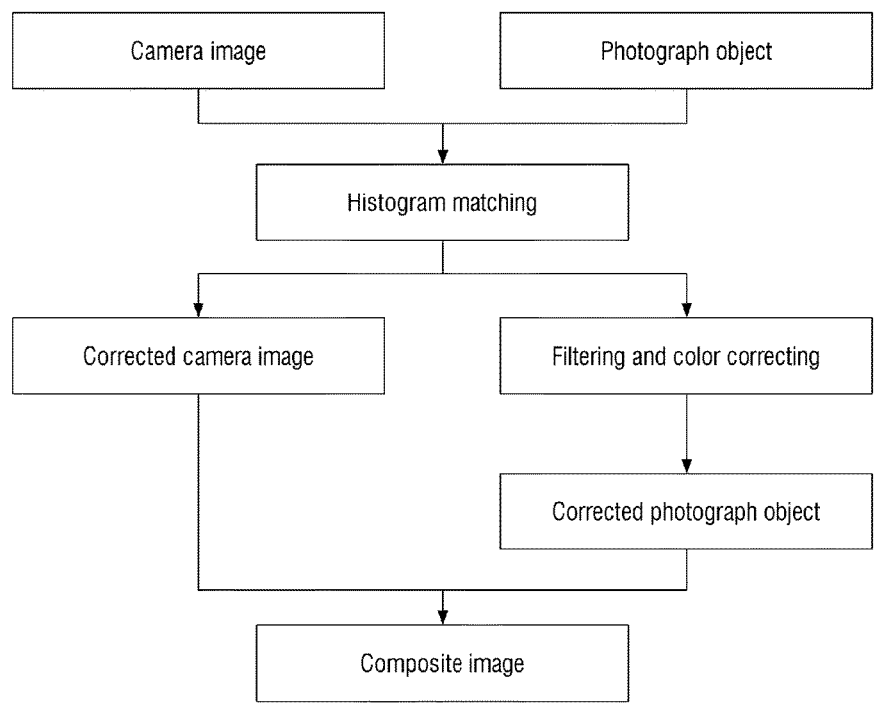
FIG. 8 is an exemplary view for describing a process in which the photograph generation apparatus enhances color and contrast and composites images according to one embodiment of the present invention.

FIG. 8 is an exemplary view for describing a process in which the photograph generation apparatus enhances color and contrast and composites images according to one embodiment of the present invention.

Referring to FIG. 8, the photograph generation apparatus may perform histogram matching using a photograph object and the photographed picture of the user which are objects of the composition as described above.

Here, the histogram matching refers to estimating a minimum value and a maximum value for each channel for the photographed picture of the user and the photograph object and matching the ranges of values between channels using a histogram stretching technique on the basis of the smallest minimum value or the largest maximum value among the estimated values by the photograph generation apparatus.

After the above-described histogram matching is performed, the photograph generation apparatus may perform filtering and/or color correcting. The filtering and/or color correcting refers to performing further filtering and color correcting of the photographed picture of the user before the photograph generation apparatus composites the photographed picture of the user and the photograph object.

The filtering and color correcting may be entirely or partially performed on the photographed picture of the user. Here, the entire picture refers to an entire image of the photographed picture of the user, and the partial picture refers to applying the filtering and color correcting only to a specific portion of the image such as skin color correcting by detecting a face from the photographed picture of the user.

The filtering refers to reducing noise present at a flat region and reducing blurring of a color boundary while edge parts of the photographed picture of the user are kept using a bilateral filter. The color correcting may be performed by extracting only the saturation component using color space conversion capable of separating chromaticity and brightness components, such as CIELAB and HSV, of an image and increasing the saturation component.

Figure 9:
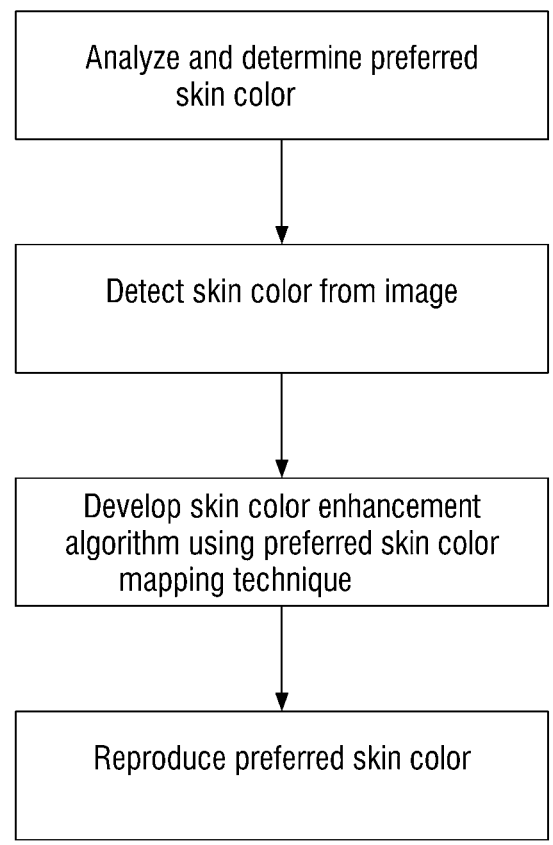
FIG. 9 is a view illustrating a flowchart of a process in which the photograph generation apparatus reproduces preferred skin color according to one embodiment of the present invention.

FIG. 9 is a view illustrating a flowchart of a process in which the photograph generation apparatus reproduces preferred skin color according to one embodiment of the present invention.

Referring to FIG. 9, in a process in which the photograph object and the photographed picture of the user in which the light source is corrected are composited, the photograph generation apparatus according to the present invention may reduce a sense of difference between a skin color in the photographed picture of the user and a skin color of the photograph object and then perform the composition.

For this, as illustrated in FIG. 9, the photograph generation apparatus may first analyze and determine a preferred skin color and detect a skin color of an object in the photographed picture of the user.

Then, the photograph generation apparatus may apply the determined preferred skin color to a skin color region of the object detected from the photographed picture of the user and reproduce the determined preferred skin color.

Here, the analysis and determination of the preferred skin color may be defined using a chromaticity coordinate system through an experiment on a preferred skin color, and the skin color of the object in the photographed picture of the user may be detected using color space. That is, a skin color may be present within a predetermined range in various color spaces. For example, in the RGB color space, an R-channel values is distributed less than a G-channel or B-channel value, and the R-channel value has higher correlation than the G-channel or B-channel values. Consequently, a skin color of the object in the photographed picture of the user may be detected in consideration of such characteristics in the color space.

The photograph generation apparatus may proportionally calculate a difference between the preferred skin color determined according to the above method and the skin color of the object detected from the photographed picture of the user and reproduce the determined preferred skin color as the skin color of the object detected in the photographed picture of the user.

Figure 10:
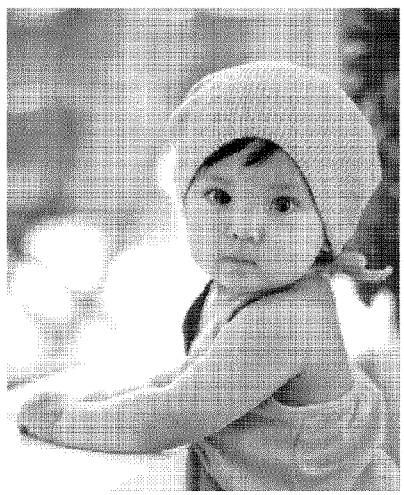
FIG. 10 is a view illustrating an input image and a skin color corrected image for describing a result of reproducing preferred skin color by the photograph generation apparatus according to one embodiment of the present invention.
Figure 10:

FIG. 10 is a view illustrating an input image and a skin color corrected image for describing a result of reproducing preferred skin color by the photograph generation apparatus according to one embodiment of the present invention.

Referring to FIG. 10, an input image in which a preferred skin color is attempted to be reproduced according to the method described above with reference to FIG. 9 using the photograph generation apparatus (or the photographed picture of the user, FIG. 10(a)) and a skin color corrected image in which the preferred skin color is reproduced (FIG. 10(b)) are illustrated.

A person's memorial color has the greatest influence on an image quality evaluation, and the memorial color plays an important role in enhancing a user's preference and image quality. Consequently, according to one embodiment of the present invention, as illustrated in FIG. 10, the skin color in the input image (or the photographed picture of the user FIG. 10(a)) may be reproduced as a skin color preferred by the user (or a memorial color, FIG. 10(b)). Accordingly, the user may acquire a picture preferred by himself for herself.

All functions that may be performed by the photograph generation apparatus that is applicable to the present invention may be implemented in the form of smartphone applications. The applications may include a function of compositing and generating a composite image according to the method described above with reference to FIGS. 1 to 9 and da function of printing the composite image on another medium. Here, the other medium may be paper or various digital media on which the composite image is output in the form of an image like an image memory.

One of ordinary skill in the art related to the embodiments of the present invention should understand that the present disclosure may be implemented in modified forms within the scope not departing from the essential feature of the above description. Therefore, the methods disclosed herein should be taken into consideration in terms of an illustrative aspect instead of a limiting aspect. The scope of the present invention is defined by the claims below instead of the detailed description of the invention, and all differences within the scope equivalent to the claims below should be interpreted as belonging to the scope of the present invention.

INDUSTRIAL APPLICABILITY

The photograph generation apparatus that controls a light source and corrects a picture according to the present invention can be applied to various apparatuses that control a light source and correct a picture.

What is claimed is:

1. A photograph generation apparatus that controls a light source and corrects a picture using an illuminance sensor and a transparent liquid crystal, the photograph generation apparatus comprising:
   a camera part configured to take a photographed picture of a user using the photograph generation apparatus;
   a lighting part configured to provide lighting for an object to be photographed using the photograph generation apparatus;
   an illuminance sensor part configured to measure an illuminance within a predetermined range of the photograph generation apparatus to use the measured illuminance in controlling the lighting of the lighting part; and
   a transparent liquid crystal panel mounted at a front surface of the camera part and configured to control an amount of a light source radiated to the camera part when the picture is being taken,
   wherein the lighting part and the transparent liquid crystal panel respectively control a brightness of the lighting and opening/closing of the transparent liquid crystal panel on the basis of the illuminance measured by the illuminance sensor,
   wherein the camera part captures an image of a user to which results of controlling the lighting part and the transparent liquid crystal panel are reflected and generates a photographed picture of the user,
   wherein the photograph generation apparatus generates an composite image in which the photographed picture of the user and a photograph object are composited,
   wherein, when generating the composite image, the photograph generation apparatus performs image correcting for each channel for the photographed picture of the user and the photograph object using a pre-installed program and then generates the composite image,
   wherein the image correcting for each channel includes separating a brightness component and a chromaticity component using color space conversion for each of the photographed picture of the users and the photograph object and enhancing color and contrast of the separated brightness component,
   wherein the image correcting for each channel further includes performing histogram comparison for the separated brightness component, analyzing an increase in gradation and distribution for each level of gray gradation, and correcting a saturation and correcting a skin color region for each of the photographed picture of the user and the photograph object on the basis of a result of the analysis.

2. The photograph generation apparatus of claim 1, wherein:
   brightness levels of the lighting provided by the lighting part are classified as Low, Normal, and High; and the lighting part controls the brightness level of the lighting due to the lighting part on the basis of the illuminance measured by the illuminance sensor part.

3. The photograph generation apparatus of claim 2, wherein the lighting part controls the brightness of the lighting to be set as High when the illuminance measured by the illuminance sensor part is a low illuminance that is lower than a predetermined reference, and the lighting part controls the brightness of the lighting to be set as Low when the illuminance measured by the illuminance sensor part is a high illuminance that is higher than the predetermined reference.

4. The photograph generation apparatus of claim 3, wherein:
a transmittance of a light source radiated to the camera part is controlled by controlling opening/closing of the transparent liquid crystal panel; and
the opening/closing of the transparent liquid crystal panel is controlled on the basis of the illuminance measured by the illuminance sensor part.

5. The photograph generation apparatus of claim 4, wherein the transparent liquid crystal panel is controlled to be open when the illuminance measured by the illuminance sensor part is a low illuminance that is lower than a predetermined reference, and the transparent liquid crystal panel is controlled to be closed when the illuminance measured by illuminance sensor part is a high illuminance that is higher than the predetermined reference.

6. The photograph generation apparatus of claim 1, further comprising a printer configured to print the image in which the photographed picture of the user and the photograph object are composited.

7. The photograph generation apparatus of claim 1, wherein:
the image correcting includes one or more of histogram matching, filtering, and color correcting;
the histogram matching includes estimating a minimum value and a maximum value for each channel for the photographed picture of the user and the photograph object and performing histogram stretching on the basis of the estimated minimum value and maximum value;
the filtering includes processing the photographed picture of the user using a bilateral filter; and
the color correcting includes correcting color or correcting skin color through face detection for the photographed picture of the user and the photograph object.

8. The photograph generation apparatus of claim 7, wherein the color correcting is performed by extracting a saturation component using color space conversion, in which brightness and chromaticity are separated, and increasing the extracted saturation component for the photographed picture of the user and the photograph object.

9. The photograph generation apparatus of claim 7, wherein the correcting of the skin color includes detecting a skin color region from each of the photographed picture of the user and the photograph object, comparing the detected skin color region with a predetermined preferred skin color, proportionally calculating a skin color difference between the skin color regions and the predetermined preferred skin color, and correcting the skin color region of each of the photographed picture of the user and the photograph object by the calculated skin color difference.

10. The photograph generation apparatus of claim 1, wherein the image correcting further includes estimating a light source brightness of each of the photographed picture of the user and the photograph object using the Retinex algorithm and correcting the estimated light source brightness.

11. The photograph generation apparatus of claim 10, wherein the correcting of the estimated light source brightness further includes performing multiple Retinex using the estimated light source brightness.

12. The photograph generation apparatus of claim 1, wherein the histogram comparison reduces over-enhancement that occurs when the photographed picture of the user and the photograph object are globally enhanced while maintaining a histogram shape of the brightness component of each of the photographed picture of the user and the photograph object to be constant.

13. The photograph generation apparatus of claim 1, wherein the photograph generation apparatus is a kiosk that includes functions of photographing and editing a picture.

* * * * *